Figure 1:
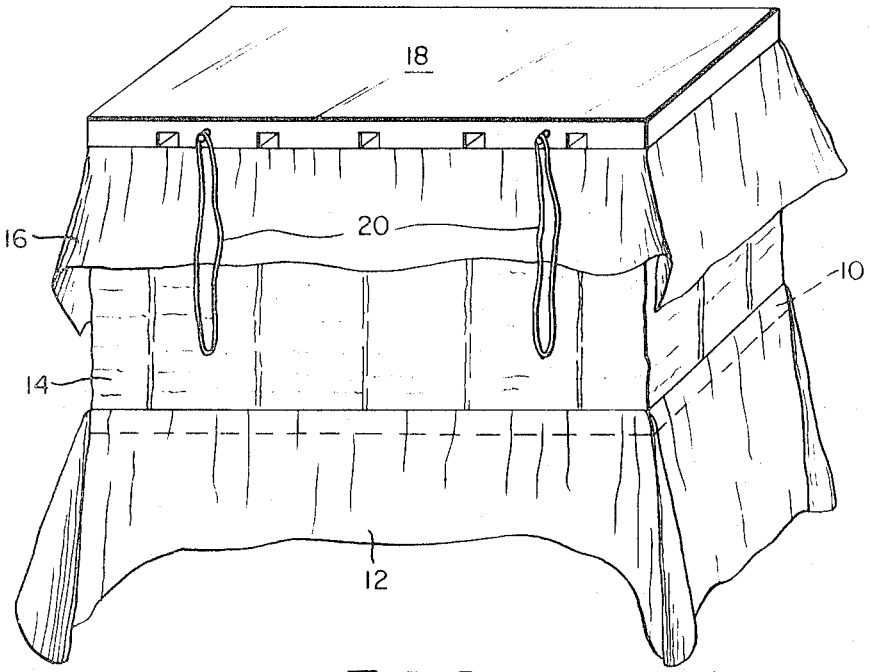
Figure 2:
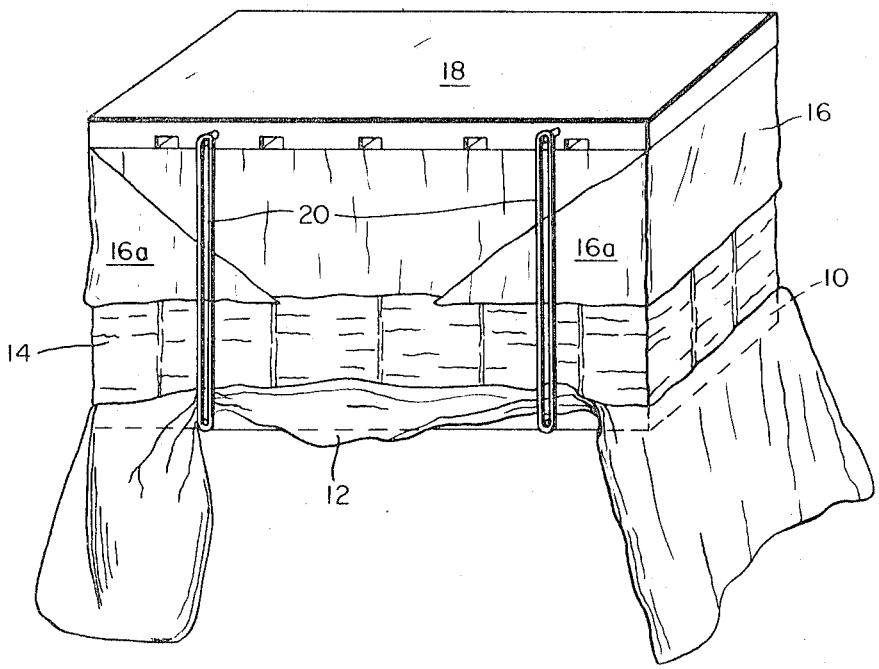
Figure 3:
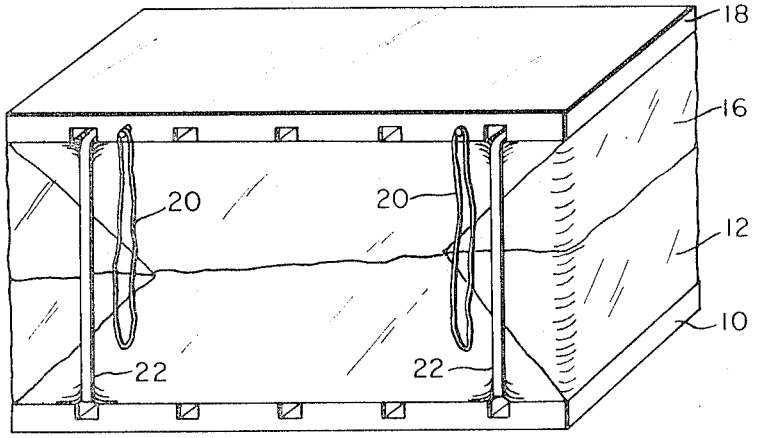
Figure 4:
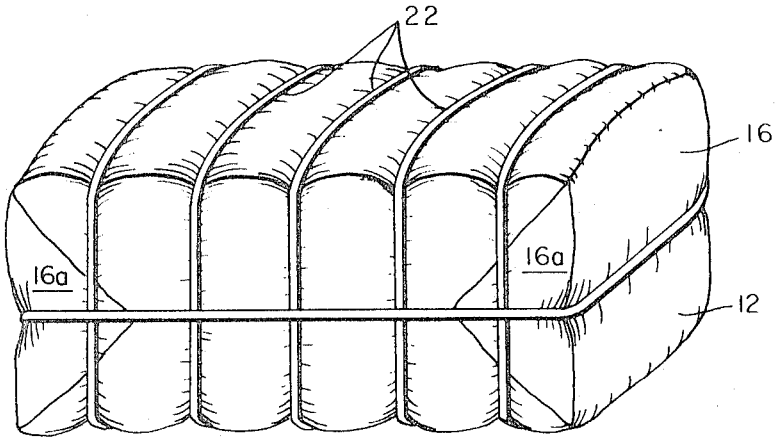

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

893 O.G. 402

T893,007
PROCESS FOR PACKAGING FIBROUS BALES
Robert Milton McCormick, 7907 Springpond Road, Columbia, S.C. 29204
Filed Jan. 5, 1971, Ser. No. 104,058
Int. Cl. B65b *27/12*
U.S. Cl. 53—27
2 Sheets Drawing. 4 Pages Specification

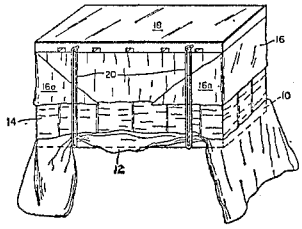

A process for packaging fibrous bales with flexible sheets of synthetic polymer without the need for prefabricating the sheets into bale configurations as, for example, in the form of sewn bags so they retain their shape around the bale during banding. The process utilizes elastic cords temporarily extended between the platens of the baler to hold the sheets in place as they are folded around the bale. After the bale is permanently banded, the elastic cords are released. The flexible sheets of synthetic polymer are preferably sheets of spunbonded synthetic fiber.

Dec. 14, 1971 R. M. McCORMICK T893,007

PROCESS FOR PACKAGING FIBROUS BALES

Filed Jan. 5, 1971 2 Sheets-Sheet 1

INVENTOR

ROBERT MILTON McCORMICK

BY Howard P. West Jr.

ATTORNEY

PROCESS FOR PACKAGING FIBROUS BALES

Filed Jan. 5, 1971 2 Sheets-Sheet 2

INVENTOR
ROBERT MILTON McCORMICK

BY Howard P. West Jr.
ATTORNEY